United States Patent

[11] 3,632,335

| [72] | Inventor | Howard Knox Worner |
| | | North Balwyn, Victoria, Australia |
| [21] | Appl. No. | 809,649 |
| [22] | Filed | Mar. 24, 1969 |
| [45] | Patented | Jan. 4, 1972 |
| [73] | Assignee | Conzinc Riotinto of Australia Limited |
| | | Melbourne, Victoria, Australia |
| [32] | Priority | Mar. 29, 1968 |
| [33] | | Australia |
| [31] | | 35728 |

[54] SEPARATION OF MOLTEN MATERIALS
24 Claims, 5 Drawing Figs.

[52] U.S. Cl. ................................................. 75/63,
75/76, 75/78, 75/83, 266/33
[51] Int. Cl. ..................................................... C22b 7/00,
C22b 15/00, C22b 11/00
[50] Field of Search ............................................ 75/63, 65,
93, 78, 86, 76; 266/33, 11; 210/21; 23/309, 312

[56]  References Cited
UNITED STATES PATENTS

| 927,758 | 7/1909 | Sinding-Larsen | 75/11 |
| 2,572,489 | 10/1951 | Jordan | 75/78 |
| 2,899,296 | 8/1959 | Kreimeier | 75/77 |
| 3,102,806 | 9/1963 | Zimmerly | 75/65 |
| 3,301,666 | 1/1967 | Martin | 75/68 |
| 3,463,472 | 8/1969 | Worner | 266/11 |

FOREIGN PATENTS

| 580,844 | 8/1959 | Canada | 75/93 |

OTHER REFERENCES

Treybal, Liquid Extraction, p. 577 (2nd ed. 1963).

*Primary Examiner*—Winston A. Douglas
*Assistant Examiner*—Peter D. Rosenberg
*Attorney*—Ryder, McAulay & Hefter ABSTRACT: A method for separating materials and apparatus for carrying out the method are disclosed which includes introducing a plurality of materials into a medial mixing zone of a horizontal launderlike furnace, maintaining the materials in a molten state and introducing into the molten materials an extractant which forms an extract with one of the molten materials. The extract having a different specific gravity from the remaining material effects formation of heavier and lighter phases which are caused to flow countercurrent to each other, the heavier phase being withdrawn from one end of the furnace and the lighter phase being withdrawn from another end of the furnace.

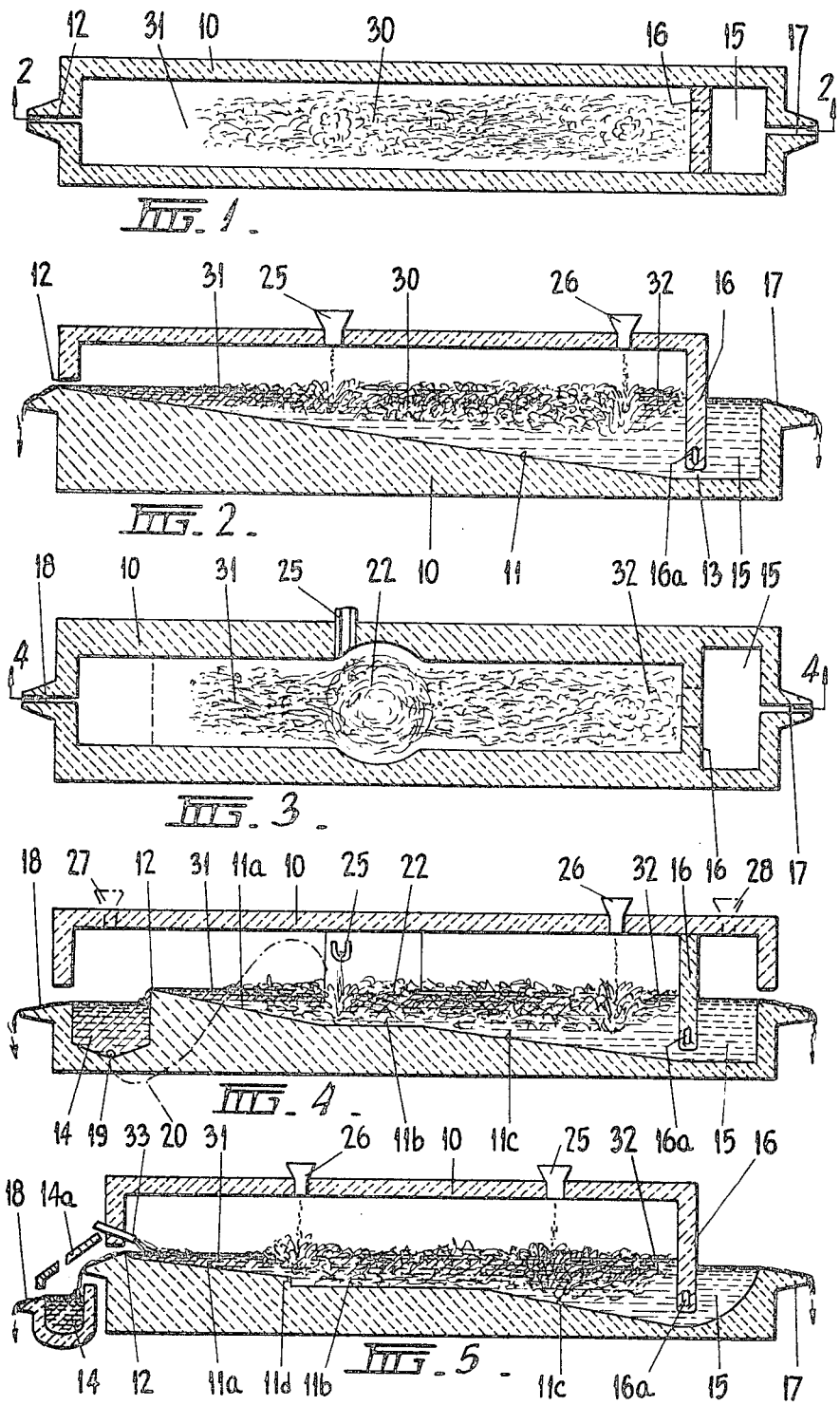

SEPARATION OF MOLTEN MATERIALS

This invention relates to the separation of molten materials and refers especially to a method and apparatus for the continuous or substantially continuous separation of metals or compounds of metals in the molten condition.

In one general form of the invention, the separation of the molten materials is effected in a substantially horizontal launderlike furnace having a hearth or floor which slopes generally from at or near one end (herein termed the shallow end) to at or near the other end (herein termed the deeper end). References to the hearth or floor "sloping generally" in a particular direction are intended to include furnaces in which the hearth or floor slopes generally downwardly, or at different inclinations, continuously or intermittently, with or without horizontal or vertical or upwardly sloping portions, including steps, from the shallow end to the deeper end.

The molten materials are caused to flow along the launderlike furnace, which is preferably elongated, in the manner hereinafter described, and composition gradients are established in the moving liquids.

The invention is described herein in relation to the separation of two molten materials, but it will be understood that it is also applicable to the separation of any number of molten materials from any number of other molten materials.

The invention may be applied to molten materials or solutions of materials (herein for convenience termed "A" and "B") particularly metals, either in the elemental form or as sulphides (as in mattes) or as halides or as other compounds, which materials A and B are miscible at elevated temperatures but which (or the components of which) exhibit substantially different solubilities or chemical combining tendencies over a particular temperature range in another molten phase, herein for convenience termed the "extractant" and designated "E." The extractant E may be said to have a preferential affinity (that is, a preferential solubility or combining tendency) for one of the molten materials, for example, the material A. The solution or compound or combination of the extractant E with the extracted material A is referred to in this specification as the "extract."

In this specification, the molten materials or solutions or compounds are understood to include not only materials with completely random distribution of the component elements but also materials with a degree of ordering of the component elements, and also molten mixtures and chemical compounds of component materials.

Preferably, the molten component A exhibits considerably solubility in or affinity for the extractant E while the molten component B has no or very low affinity for extractant E, i.e. is either insoluble or has very low solubility (for example, less than 1 percent) in the extractant E, particularly over a temperature range nearer to the freezing temperature of the mixture. The extractant E may be a metal, alloy or a chemical compound or a mixture of any of these. Other additives, which may be designated "C" and "D," may be added to facilitate the separations and are preferably added in auxiliary chambers (to be described alter) at the ends of the launderlike furnace.

For the efficient operation of the invention, it is necessary that the extract of material A in the extractant E has a different specific gravity from that of material B. It is preferred that the extract of A in E is lighter than B so that the extract A in E will tend to rise to the surface and then be made to flow towards the shallow end of the elongated launderlike furnace while B, progressively depleted of A, is made to flow generally in the opposite direction i.e. towards the deeper end, and countercurrent to the flow of extract A in E. The slope in that hearth or floor greatly assists the separation. The extract A in E is withdrawn from one end (e.g. the shallow end) of the furnace and material B is withdrawn from the other end (e.g. the deeper end) of the furnace. However, the invention also includes the case where the extract A in E is heavier than the component B and is withdrawn from the deeper end of the furnace while the lighter phase B is withdrawn from the shallow end.

The materials to be separated may be added to the furnace in solid or liquid form, or partly in solid form and partly in liquid form, and may be converted from solid to liquid form in the furnace.

The mixture of materials to be separated (e.g. A plus B) is added to the furnace at a point which is spaced from each end thereof and is preferably near to the medial region of the furnace i.e. the mixing zone. The extractant E is added to the furnace at a point which is spaced from the point of addition of A plus B and is also preferably spaced from the ends of the furnace The point of addition of the extractant E may be nearer to the shallow end or the deeper end of the furnace than the point of addition of A plus B.

In order to assist the extraction of material A by extractant E, it is desirable that vigorous mixing takes place in the medial zone of the furnace including the region where the melt A plus B enters the furnace and the region where extractant E enters the furnace. The mixing can be effected in part by the cascading action of the ingoing stream of the melt A plus B but usually some additional stirring is necessary, such as can be achieved by mechanical impellers or by the injection of gases via lances. If the latter method is used the gas chosen should form no reaction products with A or B or E which detract from either the efficiency or the smooth operation of the process.

Mixing of the phases, and the opportunity given for the extraction of A by E, may be enhanced by the provision of a substantially circular "bowl" near to the center of the elongated furnace. In this bowl circulation of the liquids can be maintained by the action of impellers or gas jets or by tangential entry of the ingoing melt A plus B or combinations of these methods.

The extractant E may be added in either the solid or molten condition, depending on the melting points involved, the heat available in the bath and other factors.

The best position for adding the extractant E is determined in each particular application of the invention according to the factors involved, but desirably the extractant E is added at some point intermediate between the entry of the melt A plus B and the exit end for B. The only escape from the furnace for E (plus A) is then at the end of the furnace remote from the point of addition of the extractant E. This ensures countercurrent flow of E relative to B.

It is important and significant that a type of "stripping" action takes place by the interaction of the freshly added extractant E with any residual component A remaining in the component B flowing slowly in the opposite direction to E. By adding E near the exit end for B, there is maximum countercurrent flow of E and B during which the said "stripping" action can occur.

While the liquids in the medial zone of the elongated furnace, including the "bowl" is incorporated in the furnace design, are maintained in a state of vigorous mixing, the liquids at or near the ends of the launderlike furnace should be more quiescent to allow phase separation and settling to occur. The zones between the medial mixing zone and the ends of the furnace are termed "settling zones."

Preferably at each end of the elongated launderlike furnace chamber there are auxiliary chambers or reservoirs, which may or may not be integral with the launderlike furnace and in which further opportunity is given for phase separation and settling. At the shallow end the auxiliary reservoir chamber conveniently receives its (lighter) liquid over a lip-type taphole or weir. The communication with the auxiliary reservoir at the deeper end, where the heavier phase progressively collects, may conveniently be a syphon-type taphole or passage. When this latter auxiliary reservoir is integral with the launderlike furnace proper, the dividing wall may be appropriately provided with fluid cooling channels.

The auxiliary chambers or reservoir may be maintained at any desired temperature independent of that of the main launderlike furnace. Indeed, marked temperature gradients can be maintained within the main furnace itself both horizontally and vertically. The objective of such temperature gradients is to assist the extractant E to achieve maximum removal of A from B. Other agents C and D respectively may be added to the auxiliary chambers at the two ends of the furnace to facilitate phase separations or to form more stable compounds or complexes of one or other of the components to be separated.

Usually the temperatures in the end settling zones and the auxiliary reservoir are lower than the temperature in the medial mixing zone. However, the operating temperatures and gradients are selected to achieve the optimal combination of good separations and smooth trouble-free performance of the furnace.

In some operations it may be desirable to permit partial solidification to occur in the auxiliary reservoir chambers and to remove the separating solid material by perforated spoons, rakes or other convenient means.

Any heavier phase B which settles out in the reservoir connected to the shallow end of the launder furnace can be tapped or pumped out intermittently for return to the mixing zone of the main launderlike furnace. Likewise, any lighter phase (for example, A in E) which rises to the surface of the liquid in the reservoir connected to the deeper end of the launder furnace can be returned intermittently by ladling or other means to the mixing zone of the furnace. This makes possible a type of two-way "refluxing" which still further enhances the efficiency of the separations.

It is convenient and advantageous in most applications of the invention for the molten mixture A and B to enter the elongated furnace at some position near to the middle of the furnace and if a "bowl" is incorporated, to enter the same tangentially as aforementioned. In some applications, entry may be at a position nearer to one or other end of the furnace.

A method of separating molten materials according to the invention comprises introducing the said materials in liquid or solid form into a substantially horizontal launderlike furnace having a generally sloping hearth, maintaining the materials in a molten state in the furnace, introducing into the furnace an extractant which forms an extract with one of the molten materials, causing the extract to flow in one direction in the furnace, causing a second molten material to flow in another direction in the furnace and countercurrent to the flow of the extract, and withdrawing the extract from the furnace separately from the second material.

In one preferred form the invention consists of a method of separating molten metals or compounds of metals which are miscible at elevated temperatures by the steps of feeding the materials in liquid or solid form substantially continuously into a medial mixing zone of a generally horizontal elongated launderlike furnace having a generally sloping hearth, adding and preferably mixing vigorously into the bath an extractant which exhibits preferential solubility or affinity for the material to be extracted and which forms an extract therewith, the specific gravity of the extract being different from that of a second molten material, whereby substantially vertical separation of the extract and the second material is effected in the furnace, causing the extract to flow in one direction along the elongated furnace, causing the second material to flow in substantially the opposite direction in the furnace at a substantially different level therein, withdrawing the extract from at or near one end of the elongated furnace, and withdrawing the second material from at or near the opposite end of the furnace.

The invention also includes apparatus for achieving the above method in the form of an elongated launderlike furnace with a sloping floor or hearth and in which there is a mixing zone situated in a generally medial position and settling zones towards the ends of the furnace. Preferably, the lighter phase leaves the furnace chamber proper over a lip-type taphole or weir at the shallow end while the heavier phase flows out via a syphon-type taphole or deep passage at the hearth level at the deeper end.

In a preferred form the furnace has auxiliary reservoir chambers at either end, that for the lighter phase receiving its liquid via a lip-type taphole or weir, and that for the heavier phase receiving its liquid via a syphon-type taphole or deep taphole or passage. Further opportunity for phase separation and settling is presented in these auxiliary reservoirs assisted by one or both of temperature change and addition of further reactants. The heavier phase which separates to the bottom of the reservoir at the shallow end and the lighter phase which rises to the top of the reservoir at the deeper end can both be returned by ladling, pumping or by other suitable means to the mixing zone in the main furnace chamber. It is thus possible to achieve either a single or a double "refluxing" action.

The advantage of this invention are the high efficiency in separation which can be achieved in a low-cost furnace of relatively simple construction by combining horizontal counterflow technology with differentials in solubility, specific gravity and temperature. The solubility and specific gravity differences are, of course, inherent properties of the components of the mixture A plus B to be separated or the extractant E added. The horizontal counterflow is achieved by the action of gravity, although flow of the lighter phase at the top of the bath may be assisted by jetting on to the surface an appropriate gas via lances or burners angled in the direction in which flow is desired.

The temperature differentials can be achieved and maintained not only along the (horizontal) length of the furnace but it its deeper section in a vertical plane as well as by use of appropriately located heaters or coolers, as the case may require. The heating may be effected by means such as burner flame(s), electrical resistance element(s), electrical induction coil(s) or electric arc(s), while the cooling may be achieved by fluid flowing through refractory metal channels or coils embedded in the furnace walls or bottom.

The invention will be better understood by reference to the accompanying drawings, in which:

FIG. 1 is a view in diagrammatic sectional plan of a furnace constructed in accordance with one form of the invention, FIG. 2 is a view in sectional elevation taken on line 2—2 of FIG. 1, FIG. 3 is a view in diagrammatic sectional plan of a furnace constructed in accordance with another from of the invention, FIG. 4 is a view in sectional elevation taken on the line 4—4 of FIG. 3, and, FIG. 5 is a view in diagrammatic sectional elevation of a furnace constructed in accordance with another form of the invention.

In each Figure, similar parts or features are represented by the same numeral. Although a linear furnace is shown in the drawings, it will be understood that furnaces of other shapes in plan (e.g. L-shape or U-shape) can be used.

In the forms of the invention shown in FIGS. 1 to 4, the extractant E forms a solution with one component A, which solution (of A in E) is lighter than the other component B. In the form of the invention shown in FIG. 5 the extractant E forms a solution with one component A, which solution (of A in E) is heavier than the other component B.

The elongated launderlike furnace 10 has a generally sloping hearth 11, a lip-type taphole or weir 12 at the shallow end and a deep taphole or syphon-type taphole 13 at the deeper end. The slope of the hearth 11 is between 3° and 30°, preferably between 5° and 15°. The molten melt A and B from which one component A is to be separated by extractant E is introduced into the medial mixing zone 30 of the furnace at a position such as that indicated at 25, while the extractant E is introduced into the furnace at at a position such as that indicated at 26. Settling zones 31 and 32 are located between the medial mixing zone 30 and the shallow and deeper ends of the furnace, respectively.

If desired, other materials or additives C and D may be added at positions 27 and 28 to the auxiliary end chambers 14 and 15 at the shallow and deeper ends respectively (see FIG. 4).

The auxiliary chambers or reservoir 14 and 15 may or may not be integral with the launderlike furnace 10. Heat flow and conservation are usually more effective in cases where the auxiliary chambers 14 and 15 are integral with the furnace but in some applications it is advantageous to be able to provide for periodic replacements of the auxiliary chambers 14, 15. This is particularly so for the auxiliary chamber 14 at the shallow end. FIG. 5 shows an application of the invention where the auxiliary chamber 14 at the shallow end is a ladle separate from the launderlike furnace.

In most applications it is convenient to have an end wall 16 at the deeper end which may be fluid cooled at some position such as 16a.

Referring to FIGS. 1 to 4, the syphon-type taphole 13 at the bottom of the deeper end of the furnace provides the outlet for the heavier phase B to flow into the chamber 15. The heavier liquid B is finally tapped or discharged over the lip-type taphole at 17. At the other end of the furnace the lighter phase (A in E) flows over the lip-type taphole 12, and where an auxiliary chamber 14 is provided (FIGS. 3 and 4), is finally removed from chamber 14 over the lip-type taphole 18.

In cases where a quantity of the heavier phase B separates in auxiliary chamber 14, it can be tapped periodically via a bottom taphole 19 and returned as shown diagrammatically by the dotted line 20 to some appropriate position in the medial mixing zone 30. With relatively low melting point phases this return of the heavier separated phase B can sometimes be achieved by a simple pump. Likewise, lighter phases (A in E) which separate and rise to the surface in the auxiliary chamber 15 may be returned into the main furnace chamber.

In FIG. 3 and 4 a furnace is shown diagrammatically in which a substantially circular mixing "bowl" 22 is provided in the mixing zone 30. In this bowl 22 liquids are vigorously mixed while circulating. The mixing means may be, for example, mechanical impellers (not shown) or gases injected via lances, (not shown). In this bowl 22 the phases move generally concurrently whereas in other parts of the furnace the lighter phase (A in E) flows towards the shallow end of the furnace, while the heavier phase B slows countercurrently to the deeper end. In this form of the invention, the generally sloping hearth 11 is provided with a sloping section 11a in the settling zone 31, a horizontal section 11b in the mixing bowl 22, and the sloping section 11c between the bowl 22 and the deeper end of the furnace.

In the form of the invention shown in FIG. 5, in which the solution A in E is heavier than the component B, the auxiliary chamber 14 comprises a separate ladle protected by a baffle 14a into which the lighter phase B flows from the furnace through taphole 12 and from which said phase flows through taphole 18. A burner 33 is directed onto the surface of the molten material in settling zone 31 adjacent to taphole 12. The heavier phase (A in E) is discharged through taphole 17. The generally sloping floor 11 has a sloping section 11a a horizontal or slightly sloping section 11b, a vertical step 11d between the sections 11a and 11b and a sloping section 11c.

Examples of the application of this invention include those listed as (a), (b), (c) and (d) hereunder. These are illustrative only and are not to be taken as limiting in any way the field of application of the invention. For convenience, the latter designations used earlier in the text have been added in brackets after the relevant components involved.

a. The continuous extraction of silver (and gold) (A) form lead bullion (B) by the addition of zinc (E).
b. The continuous separation of copper (A) and nickel (B) in molten matte form by the addition of sodium sulphide or sodium sulphate and coke or sodium sulphide and sodium chloride (E).
c. The continuous extraction of sulphur and phosphorus impurities (A) from molten pig iron (B) by the addition of strongly basic salts, such as the oxides or hydroxides or carbides of alkali or alkaline earth metals (E).
d. The continuous extraction of tin (A) from "hard head" iron (B)—tin alloy by the addition of lead (E).

(a) (b) and (c) are examples where the extractant (E) forms a solution (A in E) which is lighter then the remaining components and therefore rises to the top to flow out finally from the launderlike furnace at the shallow end. (d) is an example where the extractant (E) forms a solution (A in E) which is heavier than the remaining component and therefore sinks to the bottom to flow out finally from the launderlike furnace at the deeper end.

Examples of the practical application of the invention are as follows:

EXAMPLE 1

Drossed and softened lead bullion containing 42 oz. per ton of silver was fed at the rate of 1.6 tons per hour through channel 25 into the medial mixing bowl 22 of a pilot launder furnace of the type shown in FIGS. 3 and 4. This furnace located at the works of Sulphide Corporation Pty. Ltd., Cockle Creek, New South Wales, was 10 feet long with an average bath width of 6 inches.

The bullion was continuously desilverized by feeding finely granulated electrolytic zinc into the furnace at the point 26 at the rate of 30 pounds per hour. The calculated total residence time of the bullion was between 25 to 30 minutes. The temperature of the feed bullion was 640° C. to 660° C. and temperature gradients were established by cooling coils embedded in the refractory-lined launder furnace so that the desilverized lead emerged via passage 13 into auxiliary reservoir 15 at the deeper end of the furnace at a temperature between 325° and 335° C.

The zinc-rich alloy carrying the silver in solution flowed over the weir 12 at the opposite (shallow) end into auxiliary reservoir 14 at 425° C. to 435° C. and was allowed to cool in reservoir 14 to just above the freezing point (approximately 418° C.) before being allowed to flow out of the furnace into a holding crucible.

Vigorous stirring and mixing of the bullion and zinc in a bowl 22 was achieved by a high chrome alloy steel impeller (not shown). Additional stirring and mixing of the bath took place by jetting a slightly reducing flame (not shown) into the bath at a position (not shown) in proximity to the point 26, (the point of entry of the finely granulated zinc) and slightly closer to the shallow end of the furnace. The products of combustion left via a port (not shown) in the side of the furnace adjacent to the channel 25 carrying the bullion into the furnace.

Lead collected at the bottom of reservoir 14 was tapped out once every 8 hours, and returned by small hand ladle to the main mixing bowl at position 25. Periodically small quantities of zinc collected on top of the desilverized zinc-bearing lead flowing out through reservoir 15. This zinc was collected in a perforated ladle and recycled back via inlet 26.

The continuous desilverizing achieved a lowering of the silver content of the lead to 0.07 oz. per ton.

EXAMPLE 2

Copper was separated from a nickel-copper matte in a 10-foot long pilot launder furnace substantially identical with that used for the desilverizing of bullion in example 1, except that it was lined with dense graphite bricks and stirring and mixing were effected by a combination of a graphite simpler (not shown) in the "bowl" region 22 and a series of four jets of slightly reducing flames (not shown) directed almost vertically into the bath at equidistant positions (1 foot apart) between inlets 25 and 26.

The molten matte was introduced via channel 25 and the molten extractant (a mixture of sodium sulphide and sodium chloride in the ratio 3:1) was introduced via inlet 26. The two entry streams were approximately 5 feet apart.

The composition of the entering molten matte was:

| | |
|---|---|
| Nickel | 63.6% |
| Copper | 13.4% |
| Iron | 1.0% |
| Sulphur | 20.7% |
| Other (By difference) | 1.3% |
| Total: | 100.0 |

The molten matter entered the pilot furnace as a fluid stream at between 900° C. and 960° C. and at a rate of between 1.15 and 1.3 tons per hour from an oil-fired tilting barrel-type holding furnace which in turn was fed with nickel-rich matter from a continuous smelter.

The sodium sulphide–sodium chloride extractant was melted in an auxiliary tilting furnace and fed at the rate of 0.20 to 0.24 tons per hour and at a temperature of 850° C. to 890° C.

Temperature gradients were established along the launder so that the decopperized nickel matte left the launder furnace via passage 13 at 790° C. to 810° C. While the solution of copper and iron sulphides in sodium sulphide flowed over the weir 12 into reservoir 14 at 740° C. to 760° C. Slight further cooling took place in each of the end reservoirs 14 and 15 some solid nickel-rich matte settled to the bottom of reservoir 14 while a semiliquid crust of sodium sulphide—sodium chloride solution rose to the surface of the nickel matte flowing through reservoir 15. This was raked out periodically and recycled via inlet 26.

The decopperized nickel matte emerging via taphole 17 was found to be essentially $Ni_3S_2$ of the following composition

| | | |
|---|---|---|
| Nickel | 73.1% | |
| Copper | 0.11% | |
| Iron | 0.09% | |
| Sulphur | 25.4% | |
| Other (By difference) | 0.30% | Mainly Co and Na Sulphides |
| Total | 100.00 | |

After washing in boiling water (to remove traces of sodium sulphide—sodium chloride mixture) this material was suitable for roasting to commercial grade nickel oxide or to be otherwise refined for nickel metal production.

The copper iron sulphide bearing salt solution flowing out at taphole 18 was treated in another pilot plant for the recovery of copper sulphide and the sodium sulphide rich material was recycled to the launder furnace.

I claim:

1. A method of continuously separating a plurality of materials in which one of the materials is dissolved in or combined with an extractant and the extract formed is separated from the remaining material, the method comprising the steps of,
   a. introducing a plurality of materials into a medial mixing zone of a substantially horizontal launderlike furnace having a hearth which slopes downwardly from a shallow end thereof to the medial mixing zone and from the medial mixing zone to a deeper end,
   b. maintaining the materials in a molten state in the furnace,
   c. introducing into the molten materials an extractant which exhibits a preferential solubility or an affinity for one of the molten materials and which forms an extract therewith, the specific gravity of the extract being different from that of the remaining material effecting substantially vertical separation of the extract and the remaining material by forming a heavier and lighter phase,
   d. mixing the molten materials with the extractant,
   e. effecting flow of the extract in one direction in the furnace,
   f. effecting flow of the remaining material in the furnace countercurrent to the flow of the extract and at a different level than the extract,
   g. withdrawing the heavier phase from the deeper end and
   h. withdrawing the lighter phase from the shallow end.

2. A method according to claim 1 in which the material to be extracted is missible with the remaining material at elevated temperatures and has a preferential solubility in or affinity for the extractant.

3. A method according to claim 1 wherein the medial mixing zone is substantially circular and including the step of introducing the materials to be separated into the mixing zone substantially tangential to the mixing zone.

4. A method according to claim 1 wherein the furnace includes a main furnace chamber and at least one auxiliary chamber near the ends of the furnace and including the steps of passing one of these phases through the auxiliary chamber before being withdrawn from the furnace and returning a material separated from said one of these phases to the main furnace chamber.

5. A method according to claim 1 wherein the solubility of the remaining material in the extractant is less than 1 percent.

6. A method according to claim 1 wherein the extractant is introduced into the furnace between the point of entry of the materials and the point of withdrawal of the remaining material.

7. A method according to claim 1 wherein the extractant is introduced into the furnace near to the point of withdrawal of the remaining material.

8. A method according to claim 1 wherein the temperature of the molten materials decreases progressively towards each end of the furnace.

9. A method according to claim 1 wherein the temperature of the molten materials decreases progressively towards one end of the furnace and increases progressively towards the other end of the furnace.

10. A method according to claim 1 wherein the separated materials pas through auxiliary chambers near to the ends of the furnace before being withdrawn.

11. Apparatus for separating molten materials comprising a substantially horizontal elongated launderlike furnace having a shallow end and a deeper end, a medial mixing zone, a hearth sloping generally downwardly from the shallow end to the mixing end and from the mixing zone to the deeper end, an elongated first settling zone between the mixing zone and the shallow end and an elongated second settling zone between the mixing zone and the deeper end, means for introducing the materials to be separated into the mixing zone, means for introducing into the furnace an extractant which has a preferential solubility in or affinity for one of the molten materials and which forms an extract therewith, means for effecting mixing of the extract with the molten materials, the extract having a specific gravity which is different from the specific gravity of the remaining material resulting in the formation of a heavier phase and a lighter phase, means for effecting heavier phase and the lighter phase to flow countercurrent to one another and at different levels, means for withdrawing the extract form near one end of the furnace and means for withdrawing the remaining material from near the other end of the furnace.

12. Apparatus according to claim 1 wherein the means for introducing the extractant into the furnace is located between the means for introducing materials to be separated and the means for withdrawing the remaining material.

13. Apparatus according to claim 11 wherein the means for introducing the extractant into the furnace is located near the means for withdrawing the remaining material.

14. Apparatus according to claim 11 including a baffle near the deeper end to prevent the outflow of the lighter phase at the deeper end and to cause the lighter phase to flow toward the shallow end countercurrent to the flow of the heavier phase.

15. Apparatus according to claim 1 wherein the means for introducing the extractant into the furnace is located near the deeper end of the furnace.

16. Apparatus according to claim 11 and having an auxiliary chamber at at least one end of the furnace means communicating between the furnace chamber and the auxiliary chamber, and means for introducing material into the auxiliary chamber.

17. Apparatus according to claim 1 wherein the medial mixing zone is substantially circular in plan and the materials to be separated are introduced substantially tangentially into the said mixing zone.

18. Apparatus according to claim 11 and having an auxiliary chamber at the deeper end of the furnace and means communicating between the furnace chamber and the said auxiliary chamber.

19. Apparatus according to claim 11 and having a auxiliary chamber at the shallow end of the furnace, and means communicating between the furnace chamber and the said auxiliary chamber.

20. Apparatus according to claim 18 and having means for returning to the furnace chamber material which separates from the material flowing through the auxiliary chamber.

21. Apparatus according to claim 19 and having means for returning to the furnace chamber material which separates from the material flowing through the auxiliary chamber.

22. Apparatus according to claim 11 wherein the slope of the furnace hearth is between 3° and 30°.

23. Apparatus according to claim 22 wherein the slope of the furnace hearth is between 5° and 15°.

24. Apparatus according to claim 11 wherein the section of the furnace hearth beneath the medial mixing zone is substantially horizontal.

* * * * *

UNITED STATES PATENT OFFICE
CERTIFICATE OF CORRECTION

Patent No. 3,632,335    Dated    January 4, 1972

Inventor(s) Howard Knox Worner

It is certified that error appears in the above-identified patent and that said Letters Patent are hereby corrected as shown below:

Column 1, Line 47 - change "considerably" to "considerable"

Column 1, Line 57 - change "alter" to "later"

Column 3, Line 8 - change "reservoir" to "reservoirs"

Column 4, Line 40 - change "from" to "form"

Column 4, Line 73 - change "reservoir" to "reservoirs"

Column 5, Line 58 - change "latter" to "letter"

Column 6, Line 59 - change "simpler" to "impeller"

Column 7, Line 1 - change "matter" to "matte"

Column 7, Line 5 - change "matter" to "matte"

Column 7, Line 28 - change "0.3" to "1.3"

Column 7, Line 53 - change and insert the word "in" after the word "solubility"

Column 8, Line 25 - change "pas" to "pass"

Column 8, Line 43 - insert the word "the" after the word "effecting"

UNITED STATES PATENT OFFICE
CERTIFICATE OF CORRECTION

Patent No. 3,632,335      Dated January 4, 1972

PAGE - 2

Inventor(s) Howard Knox Worner

It is certified that error appears in the above-identified patent and that said Letters Patent are hereby corrected as shown below:

Column 8, Line 48 (first line of claim 12) - change "1" to "11"

Column 8, Line 60 (first line of claim 15) - change "1" to "11"

Column 8, Line 68 (first line of claim 17) - change "1" to "11"

Column 8, Line 73 (second line of claim 18) - insert a "," after the word "furnace"

Column 9, Line 3 - change the word "a" to "an"

Signed and sealed this 13th day of June 1972.

(SEAL)
Attest:

EDWARD M. FLETCHER, JR.      ROBERT GOTTSCHALK
Attesting Officer      Commissioner of Patents